(12) United States Patent
Huggett et al.

(10) Patent No.: US 8,179,460 B2
(45) Date of Patent: May 15, 2012

(54) SYSTEM, METHOD, AND APPARATUS FOR VARIABLE RATE PIXEL DATA TRANSFER AND STORAGE

(75) Inventors: Anthony Huggett, Basingstoke (GB); Neal Crook, Berkshire (GB); Graham Kirsch, Tadley (GB); Michael Lockey, Alton (GB)

(73) Assignee: Aptina Imaging Corporation, George Town (KY)

( * ) Notice: Subject to any disclaimer, the term of this patent is extended or adjusted under 35 U.S.C. 154(b) by 687 days.

(21) Appl. No.: 12/234,725

(22) Filed: Sep. 22, 2008

(65) Prior Publication Data

US 2010/0073535 A1   Mar. 25, 2010

(51) Int. Cl.
*H04N 3/14* (2006.01)
*H04N 5/335* (2011.01)
(52) U.S. Cl. ......... 348/294; 348/297; 348/298; 348/308
(58) Field of Classification Search ................. 348/294, 348/297, 298, 302, 308, 312; 250/208.1; 257/290–292
See application file for complete search history.

(56) References Cited

U.S. PATENT DOCUMENTS

| 4,855,822 | A | | 8/1989 | Narendra et al. |
| 5,841,471 | A | * | 11/1998 | Endsley et al. ............ 348/231.6 |
| 6,034,733 | A | | 3/2000 | Balram et al. |
| 6,154,518 | A | | 11/2000 | Gupta |
| 7,015,954 | B1 | | 3/2006 | Foote et al. |
| 7,088,771 | B2 | | 8/2006 | Yavits et al. |
| 7,312,845 | B2 | | 12/2007 | Silverbrook |
| 2006/0165176 | A1 | | 7/2006 | Raveendran et al. |

FOREIGN PATENT DOCUMENTS

| JP | 2007-136816 | 6/2007 |
| WO | WO 98-19450 | 5/1998 |

OTHER PUBLICATIONS

T. Haniamoto et al., "Image Sensor for Compression and Enhancement", ieeexplore.ieee.org/iel3/4015/11533/00527477.pdf.

* cited by examiner

*Primary Examiner* — Yogesh Aggarwal
(74) *Attorney, Agent, or Firm* — Nancy Y. Ru

(57) ABSTRACT

A variable rate image sensor outputs pixel data at a variable rate using lookup tables to selectively read out particular rows at particular times. The readout rate is not constant, allowing for a smaller image buffer in the overall system.

29 Claims, 15 Drawing Sheets

BACKGROUND

BACKGROUND

SYSTEM, METHOD, AND APPARATUS FOR VARIABLE RATE PIXEL DATA TRANSFER AND STORAGE

TECHNICAL FIELD

Embodiments disclosed herein relate generally to imaging, and in particular to variable rate pixel data transfer and storage.

BACKGROUND

Image sensors, including those used for video applications, have pixel cells for detecting light. Typically, each pixel cell integrates (e.g., accumulates) an amount of charge representing an intensity of detected light. As a reference to photosensitive film, pixel cells are commonly said to be "exposed" for the duration that they integrate such charge. After integration, each pixel cell reads out an analog pixel signal representing the amount of integrated charge and, in turn, thereby representing the intensity of the detected light. The pixel signal is used to generate digital pixel data, i.e., a digital pixel value, representing the intensity of the detected light in a digital format. The pixel signals generated by a collection of pixel cells, which are typically arranged as rows and columns of an array, are used to generate pixel data representing an image captured by the image sensor.

FIG. 1 is a circuit diagram of a conventional four-transistor CMOS pixel cell 170. Prior to integration of the pixel cell 170, the reset transistor 142 and charge transfer transistor 128 are simultaneously switched on (by applying a reset signal RST and charge transfer signal TX to their respective gate terminals) to connect the photosensor 124 to a voltage source 130 (e.g., a source of a VDD voltage) and drain the photosensor 124 of previously integrated charge. During integration, which begins in response to switching off both the reset transistor 142 and charge transfer transistor 128, light strikes the photosensor 124 to integrate charge. For example, light may strike the pn-junction of a photodiode and thereby cause electrons to accumulate within the n-type region. After integration and in response to a charge transfer signal TX, the charge transfer transistor 128 gates the integrated charge from the photosensor 124 to a storage node 126 (e.g., to a floating diffusion region). In this example, the transfer of integrated charge marks the end of integration and the beginning of the pixel signal readout.

The transferred charge biases the gate of a source follower transistor 132. A first terminal of the source follower transistor 132 is connected to the voltage source 130. A second terminal, which transmits an image signal Vsig indicating the amount of integrated charge stored by the storage node 126 or a reset signal Vrst indicating the reset voltage stored at the storage node 126, is connected to a column line 136. In response to a row select signal ROW, a row select transistor 134 gates the image signal Vsig (or reset signal Vrst) to the column line 136. The storage node 126 is reset by activating the reset transistor 142 to connect the voltage source 130 to the storage node 126.

An example of a pixel signal readout operation is described with reference to FIG. 2, which is a block diagram illustrating a conventional CMOS image sensor 101. As shown, the image sensor 101 includes a pixel array 30 having rows 30R and columns 30C of pixel cells 170. The pixel array 30 is connected to a row selector 42. Under the direction of the timing and control circuit 44, the row selector 42 causes each pixel cell 170 of a selected row 30R to transmit at least one output signal Vout, via its respective column line 136, to a sample-and-hold circuit 45. A column bus 43 then selectively passes the output signals Vout to a system of components for generating pixel data.

In this example, each pixel cell 170 transmits two output signals Vout, a reset signal Vrst and the image signal Vsig, to the sample and hold circuit 45. The reset signal Vrst and image signal Vsig of each pixel cell 170 within the selected row 30R are stored by respective capacitor in the sample and hold circuit 45. After the sample and hold circuit 45 stores the reset signal Vrst and image Vsig signal for a respective pixel cell 170, those signals Vrst, Vsig are converted to a differential signal (Vrst−Vsig) by a differential amplifier 46. The differential signal (Vrst−Vsig) is digitized by an analog-to-digital converter (ADC) 47, and the digital pixel data is input as an input signal SIGin to an image processing chain contained within an image processor 48.

Image capture is performed as part of a global shutter or rolling shutter operation. In a global shutter operation, all of the pixel cells 170 within the pixel array 30 would be integrated at the same time. In a rolling shutter operation, the pixel cells 170 of the pixel array 30R would be integrated on a row-by-row basis. Thus, in a rolling shutter operation, the start time and end time of integration is different for each row 30R of pixel cells 170. However, in both a global shutter operation and rolling shutter operation, the duration of integration would typically be equal for each row 30R of pixel cells 170; and the duration of the pixel signal readout operation would typically be equal for each row 30R of pixel cells 170.

Regardless of whether a global shutter operation or rolling shutter operation is employed, the pixel signals of the pixel cells 170 are read out on a row-by-row basis. For example, the image signals Vsig and reset signals Vrst of all pixel cells 170 within a selected row 30R may be simultaneously stored by respective capacitors of the sample-and-hold circuit 45 and then, under the direction of the control bus 43, passed to the differential amplifier 46. Such a readout would be repeated for each row 30R of the pixel array 30.

The image sensor 101 may write the pixel data into a buffer used by the image processor 48. In such instances, the buffer would typically store the pixel data of less than all of the rows 30R of pixel cells 170 of the image sensor 101, and overwrite the stored pixel data on a first-in/first-overwritten basis, i.e., the first row of pixel data stored would be the first row of pixel data overwritten. The rates of outputting the pixel data from the image sensor 101 and inputting the pixel data to the buffer are typically fixed and equal (i.e., determined by the characteristics of the system). The rate at which the pixel data can be overwritten in the buffer, without losing the stored pixel data that is still being used for processing, is also typically fixed. When new pixel data is written to the buffer, the memory usage of the buffer increases. When the stored pixel data is no longer needed for processing and therefore can be overwritten without losing needed data, the memory usage of the buffer decreases. The rates of these changes are herein referred to as the input rate and discard rate, respectively. The difference of the input rate and discard rate determines whether the memory usage of the buffer is increasing or decreasing at a given moment.

Processing of the pixel data by the image processor 48 may involve, but is not limited to, modifying one row of pixel data (i.e., a line of an image captured by the image sensor 101) based on multiple rows of pixel data. The amount of data required to perform the image processing operation may vary across the image, from pixel to pixel and from row to row. The region of the image at which the largest amount of data is required to perform the transformation gives rise to a fundamental requirement of buffering. In that case, the buffer must store at least the maximum amount of data used to create any one line of output pixel data. This is one example of a "fundamental requirement," which is the maximum amount of data required simply to perform any processing operation due to spatial considerations. With dewarp, the top or bottom of the image, where distortion is greatest, require the largest amount of input data (and therefore, the largest amount of buffering) in order to perform the transformation; the part of the image nearer the center requires less buffering. In addition to the fundamental requirement, the buffer must also accommodate any increases in memory usage that occur for example where the input rate exceeds the discard rate, or where timing constraints force the loading of part of the data for a second frame of processing before the first frame has finished. Such increases in memory usage can require imaging systems to employ buffer sizes that are substantially larger than the fundamental requirement in order to ensure that the buffer capacity will meet the greatest memory usage of a processing operation. In many systems, however, it is desirable to employ a smaller buffer to conserve die space. Accordingly, embodiments of an imaging method, apparatus, and system are disclosed herein which adjust the output rate of a sensor (and thereby adjust the input rate of a buffer) to decrease the memory usage of a processing operation.

DESCRIPTION OF THE INVENTION

The accompanying drawings illustrate specific embodiments of the invention, which are provided to enable those of ordinary skill in the art to make and use them. It should be understood that the claimed invention is not limited to the disclosed embodiments as structural, logical, or procedural changes may be made.

Figure 1:
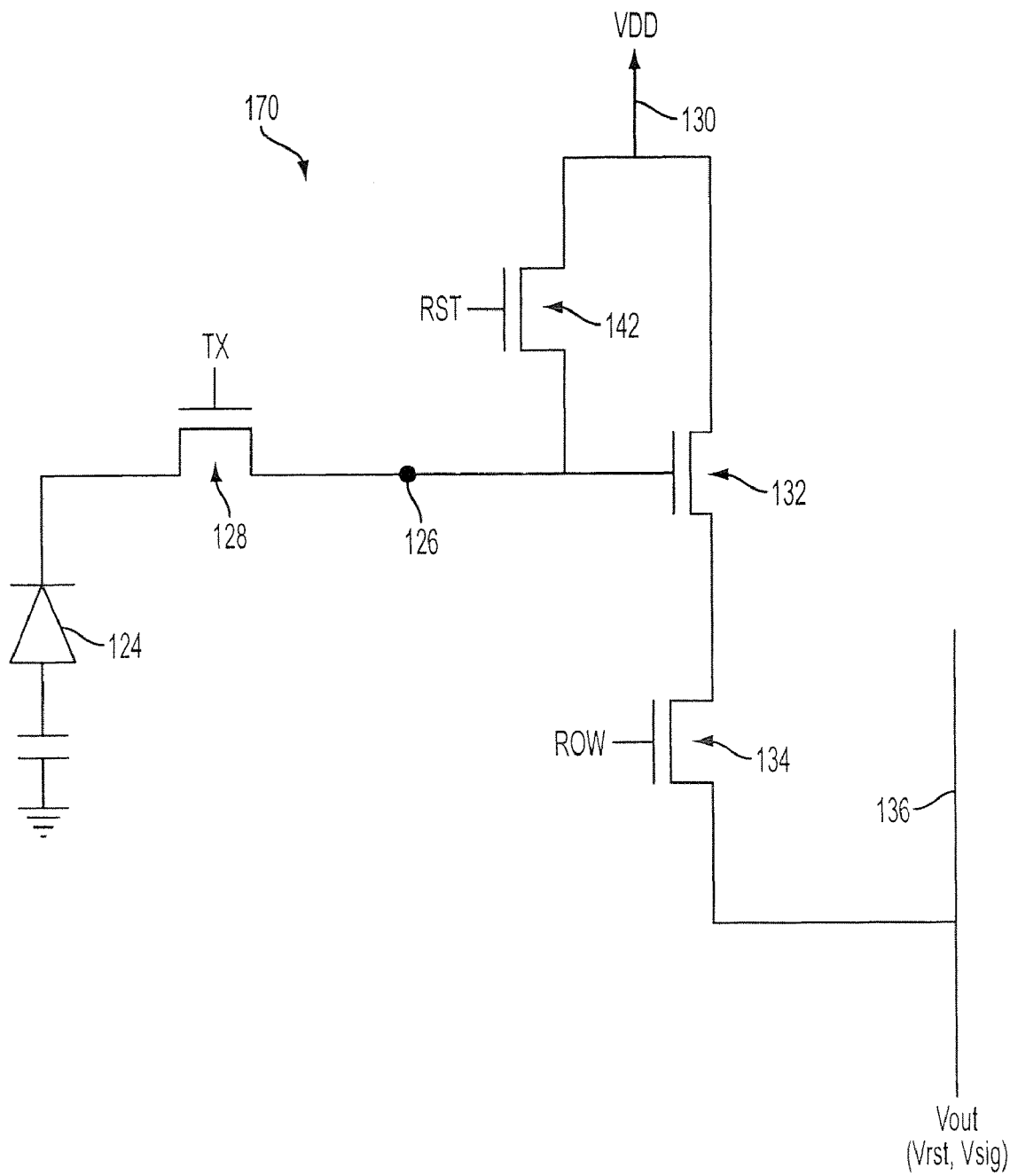
FIG. 1 is a circuit diagram of a conventional CMOS pixel cell.
Figure 2:
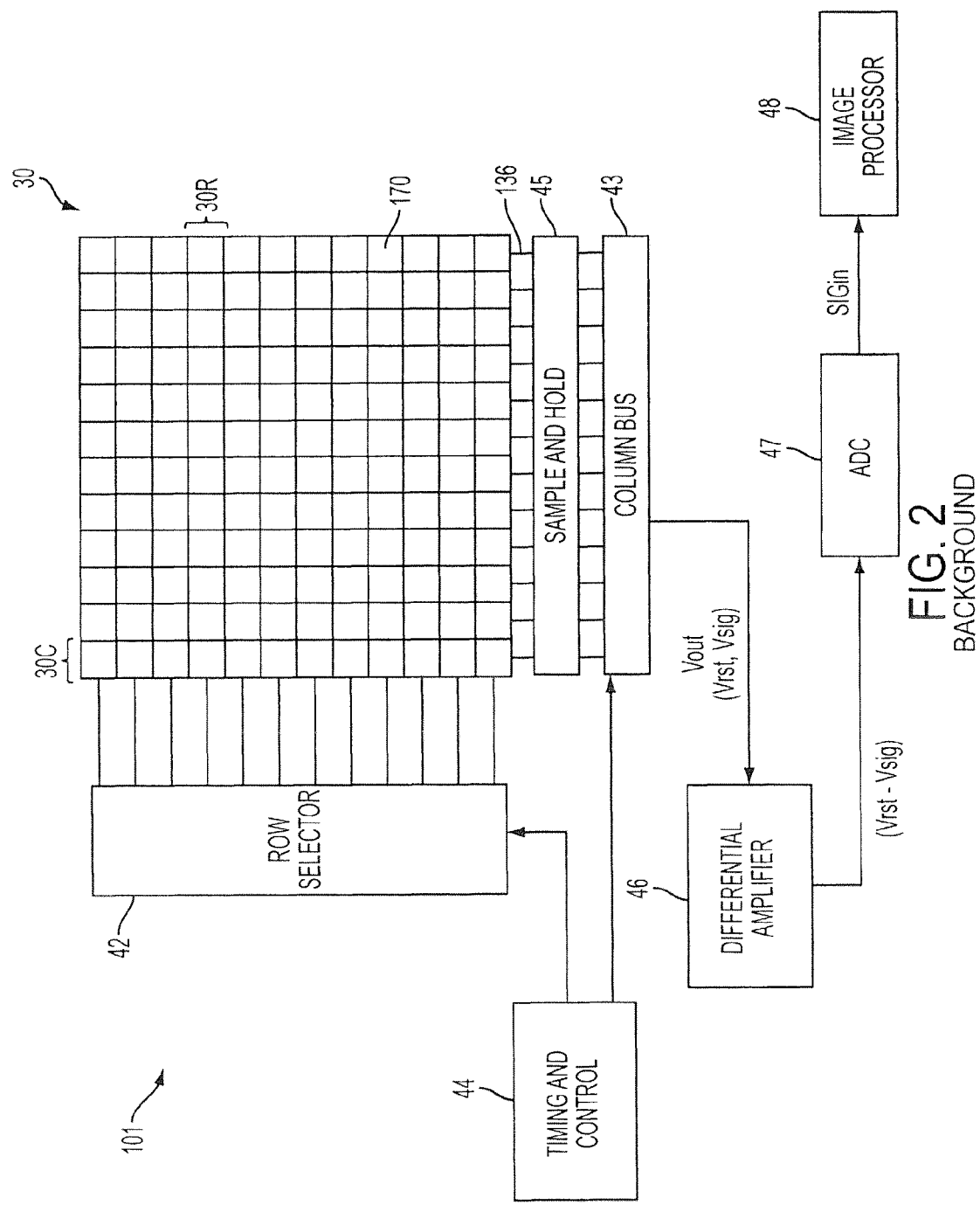
FIG. 2 is a block diagram of a conventional CMOS image sensor.
Figure 3:
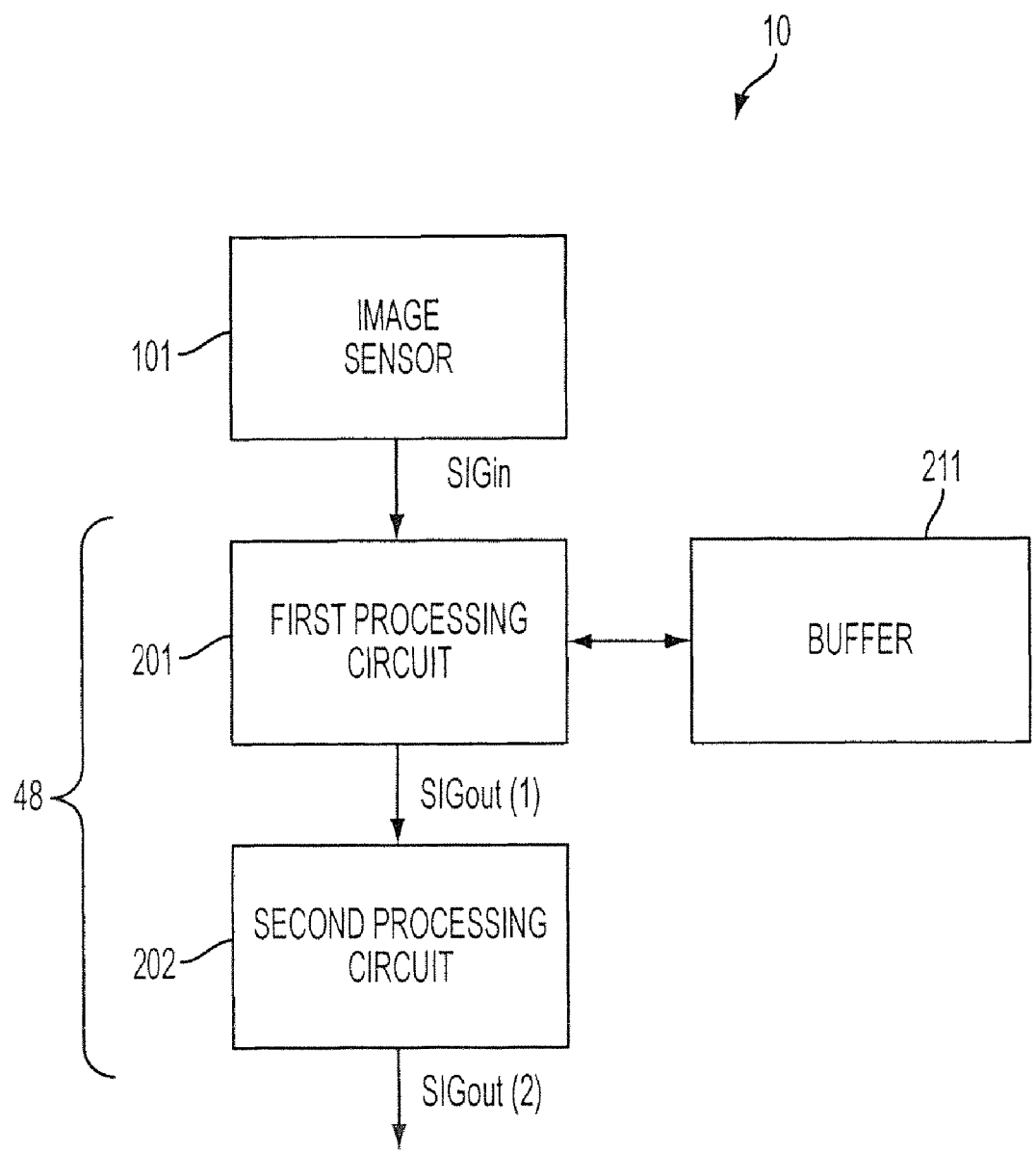
FIG. 3 is a block diagram of a conventional imaging system having an image sensor and processor with fixed output and input rates, respectively.

FIG. 3 is a block diagram of a portion of an imaging system 10 employing the image sensor 101 and image processor 48 of FIG. 2. The image sensor 101 has a fixed output rate. Consequently, the image processor 48 receives the pixel data, via the input signal SIG, at a fixed input rate. The image processor 48 includes a first processing circuit 201, which uses an associated buffer 211 that is large enough to accommodate the greatest memory usage of the associated processing operation of the processor 48.

The image sensor 101 streams pixel data, pixel-by-pixel, to the buffer 211 associated with the first processing circuit 201. However, the pixel data is output by the image sensor 101 and written to the buffer 211 at least one row at time, e.g., in streams of pixel data with a blanking interval (no output) after each row of pixel data. The first processing circuit 201 processes the stored pixel data, which is then output to second downstream processing circuit 202. The first processing circuit 201 may implement the operations including, but not limited to, positional gain adjustment, dewarping, pixel defect correction, noise reduction, optical cross talk reduction, demosaicing, or other processing operations. Many of these operations require an associated buffer for holding multiple rows of pixel data for processing.

Figure 4A:
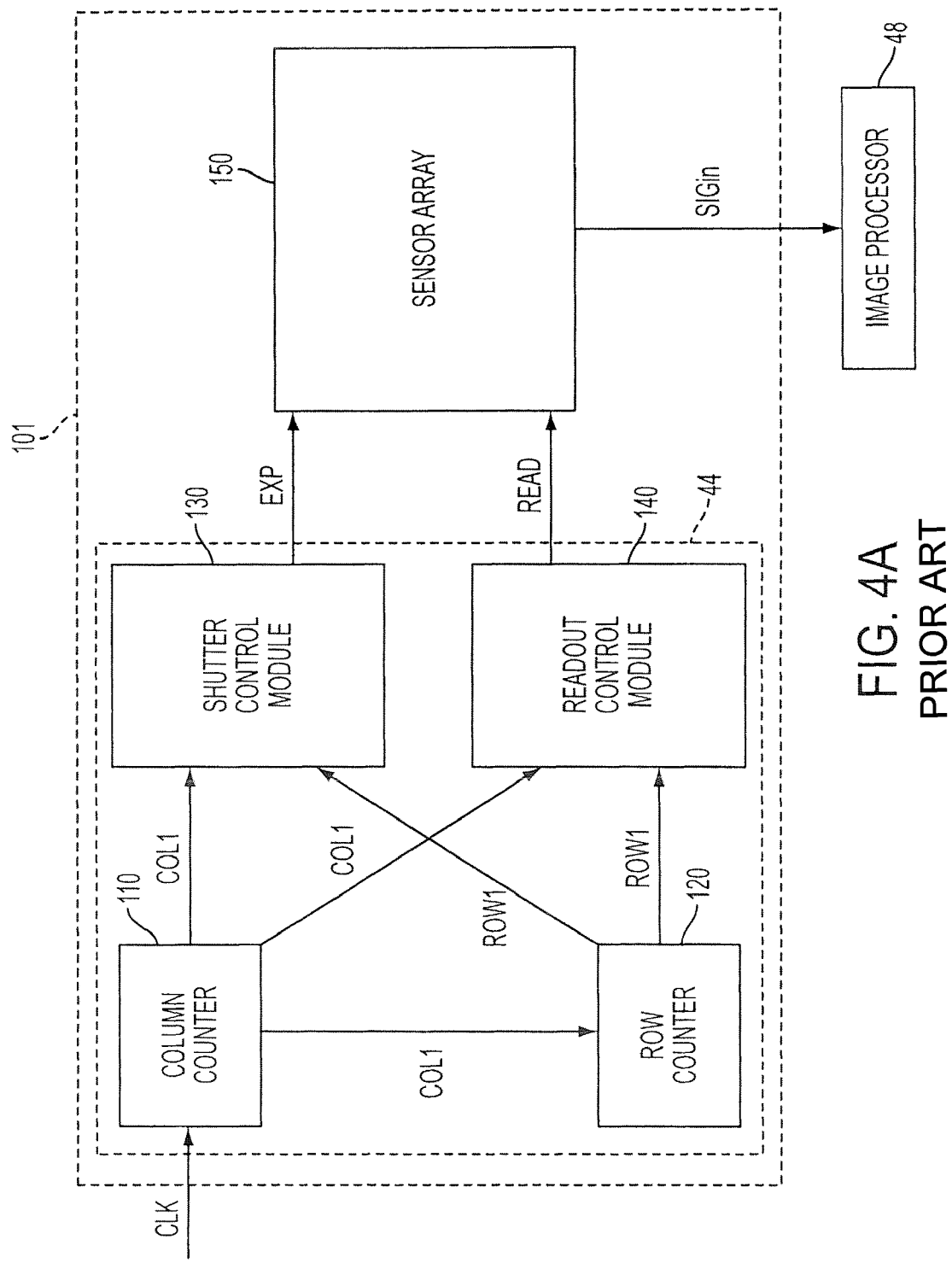
FIG. 4A is a block diagram of the image sensor of FIG. 3.

FIG. 4A is a block diagram further illustrating the structures, shown in FIG. 2, for operating the image sensor 101. As shown, a column counter 110, row counter 120, shutter control module 130, and readout control module 140 are provided as part of the timing and control circuit 44. A sensor array 150, which comprises the pixel array 30, row selector 42, column bus 43, sample-and-hold circuit 45, differential amplifier 46, and analog-to-digital converter (ADC) 47, integrates charge and generates pixel data in response to an exposure signal EXP and readout signal READ, respectively, received from the timing and control circuit 44. The generated pixel data is input by the image processor 48 as input signal SIGin.

The timing and control circuit 44 inputs a clock signal CLK to the column counter 110, which stores a current "column number" identifying a column position of the sensor array 150 (and, more particularly, a column position of the pixel array 30). The column number is set to "0" at the start of image frame output, and increments by "1" in response to a predetermined number of cycles of the clock signal CL-K. The column counter 110 outputs a column number signal COL1, which indicates the current column number of the column counter 110, to the row counter 120, the shutter control module 130, and the readout control module 140. When the column number reaches the number of pixel cells 170 per row 30R of the sensor array 150, the column counter 110 resets the column number to "0."

The row counter 120 stores a "row number" identifying a row position of the sensor array 150. The row number is set to "0" at the start of image frame output, and increments by "1" each time the column number, as indicated by the column number signal COL1, is reset to "0." The row counter 120 outputs a row number signal ROW1, which indicates the value of the row counter 120, to the shutter control module 130 and readout control module 140. The row counter 120 is reset to "0" when it reaches the number of pixel cells 170 per column 30R of the sensor array 150.

In a global shutter operation, all of the pixel cells 170 of the sensor array 150 would be integrated simultaneously. In this example, the sensor array 150 performs a rolling shutting operation. Based on the row and column numbers, as indicated by the column and row number signals COL1, ROW1, the shutter control module 130 controls the row-by-row integration of the pixel cells 170 within the sensor array 150. More particularly, at a particular time indicated by the row and column numbers, the shutter control module 130 initiates a readout interval for a respective row 30R of pixel cells 170 by outputting an exposure signal EXP identifying the particular row 30R to be integrated.

Based on the row and column numbers, as indicated by the column and row number signals COL1, ROW1, the readout control module 140 controls the readout of the pixel cells 170 within the sensor array 150. More particularly, at a particular time indicated by the row and column numbers, the readout control module 140 initiates a readout interval for a respective row 30R of pixel cells by outputting a readout signal READ identifying the particular row 30R to be read out of the sensor array 150. As previously noted, during the readout interval, pixel data is determined from the integrated charge of each pixel cell 170. Typically, for a CMOS imager, each of the pixel cells 170 generates a pair of analog reset and photogenerated signals Vrst, Vsig which are processed and then digitized by one or more analog-to-digital converters (and, in this example, by single ADC 47).

Figure 4B:
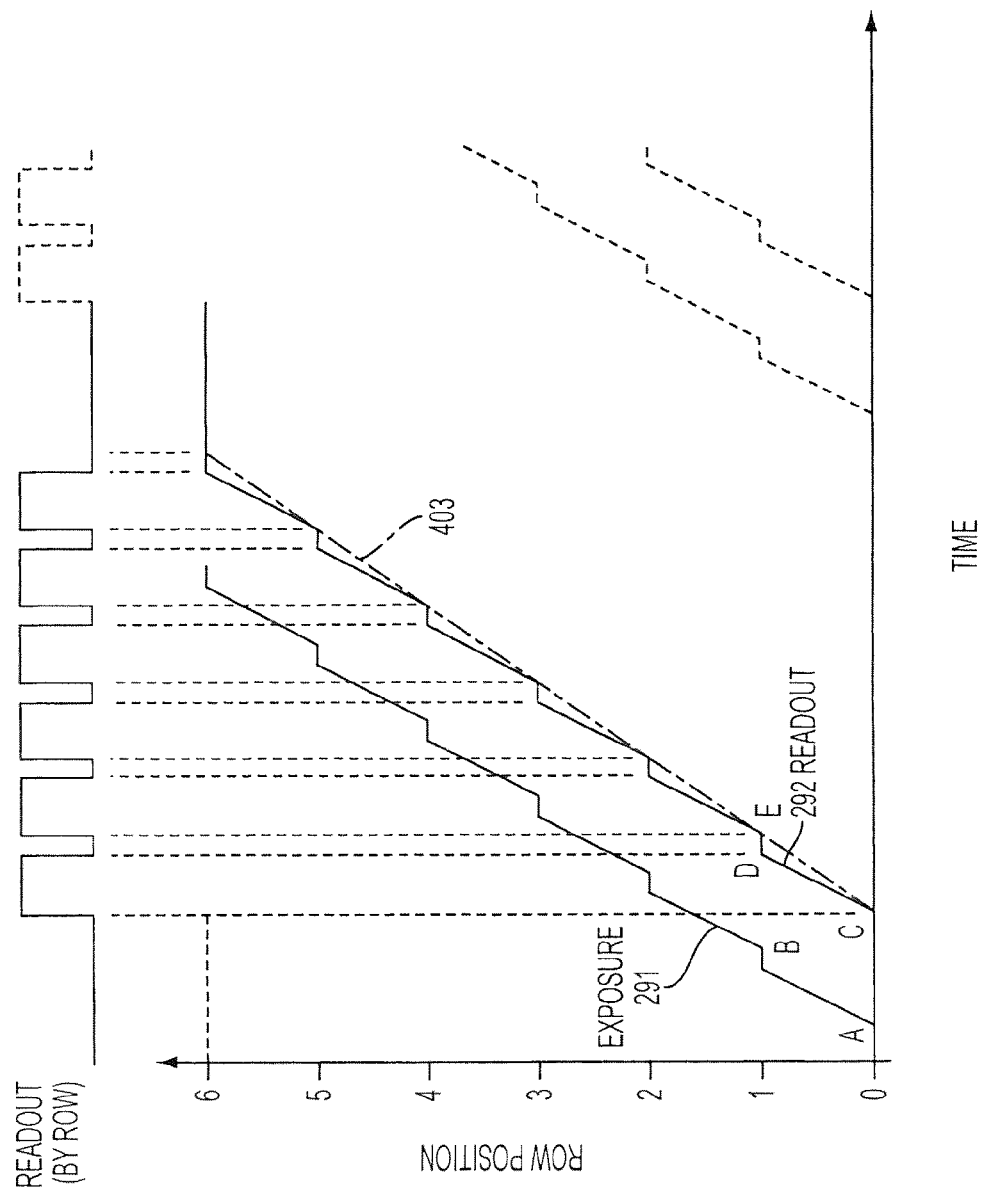
FIG. 4B is graph illustrating a conventional rolling shutter operation which may be employed by the image sensor of FIG. 4A.

FIG. 4B is a timing diagram illustrating, by example, integration and readout intervals that may be employed by the image sensor 101 for the rolling shutter operation. In the timing diagram, the vertical axis represents the row position of the pixel cells. The horizontal axis represents time. The integration interval of a row 30R continues until its readout interval, spanning from the latest point (as measured horizontally from the row position mark of the vertical axis) on the exposure line 291 until the latest point on the readout line 292 (as measured horizontally from the row position mark of the vertical axis). For example, the integration interval of row 0 spans from time A to time C. The integration interval of row 1 spans from time B to time E. Thus, although the pixel cells 150 are exposed row-by-row, their integration intervals typically overlap one another in a rolling shutter operation.

The readout interval of a row 30R spans from the latest point on the readout line 292 (as measured horizontally from the row position mark of the vertical axis) until the blanking interval of the next row 30R, which is shown as a respective flat portion of the readout line 292. For example, the readout interval of row 0 spans from time C to D. The blanking interval of row 1 spans from time D to E. Thus, as can be seen, the readout intervals of the rows 30R do not overlap one another, but rather have blanking intervals between them. However, the readout intervals of the rows 30R may overlap the integration intervals of other rows 30R. The timing of this output of pixel data, which corresponds to the readout intervals, is shown above the readout line 292. The average output rate, shown as line 403, of the pixel data from sensor array 150 has a constant rate.

Figure 5A:
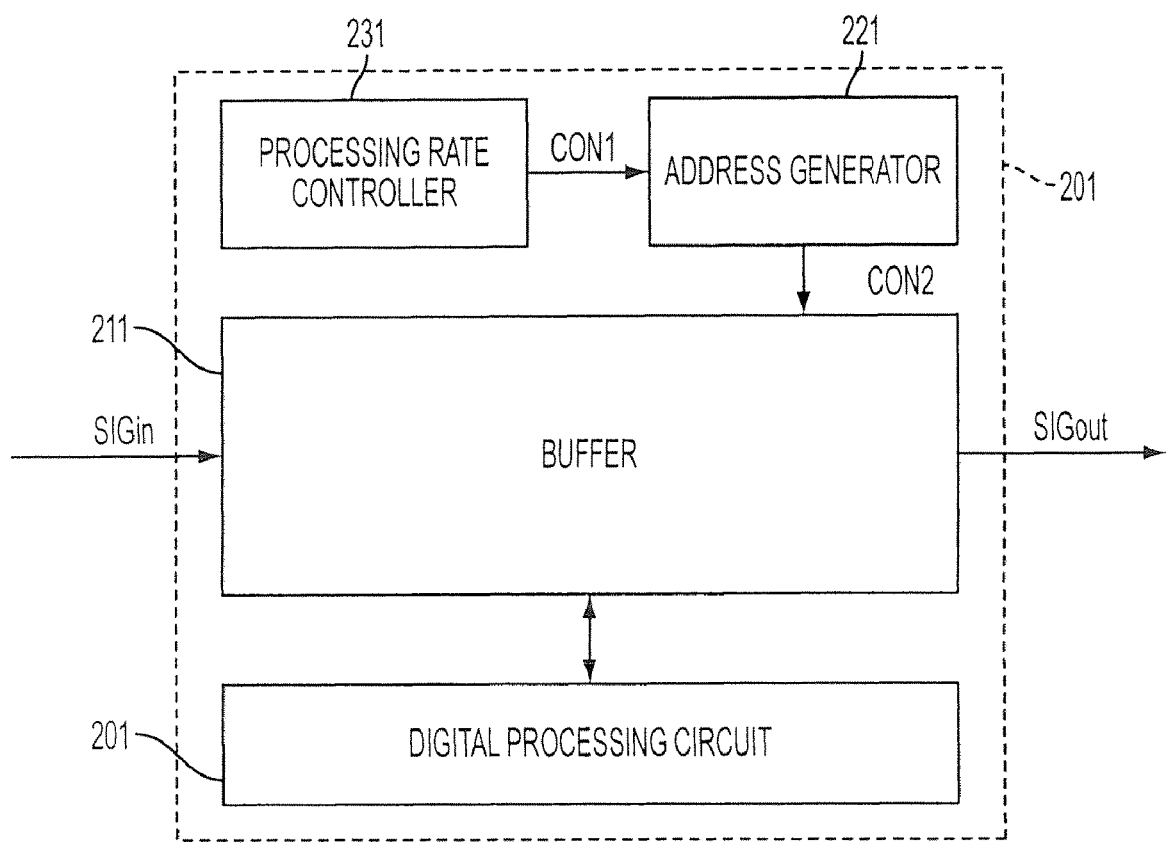
FIG. 5A is a block diagram of a processor of FIG. 3.

FIG. 5A is a block diagram of at least a portion of the first processing circuit 201 of FIG. 3 and its associated buffer 211. While pixel data is within the buffer 211, the first digital processing circuit 201 acts on the pixel data in accordance with a processing operation to be performed. A processing rate controller 231 transmits a first control signal CON1 to an address generator 221. A first control signal CON1 instructs the address generator 221 when and which pixel of the stored pixel data should be read out next as part of the output signal SIGout. In turn, the address generator 211 outputs a second control signal CON2 to the buffer 211. The second control signal CON2 instructs the buffer 211 to read out a corresponding pixel of the stored pixel data. Based on the timing of the first control signal CON1, each line of the pixel data can be output as output signal SIGout in accordance with the timing requirements of the processing circuit 201. After the pixel data in the buffer 211 is no longer needed, it may be overwritten line-by-line with new pixel data by input signal SIGin.

Figure 5B:
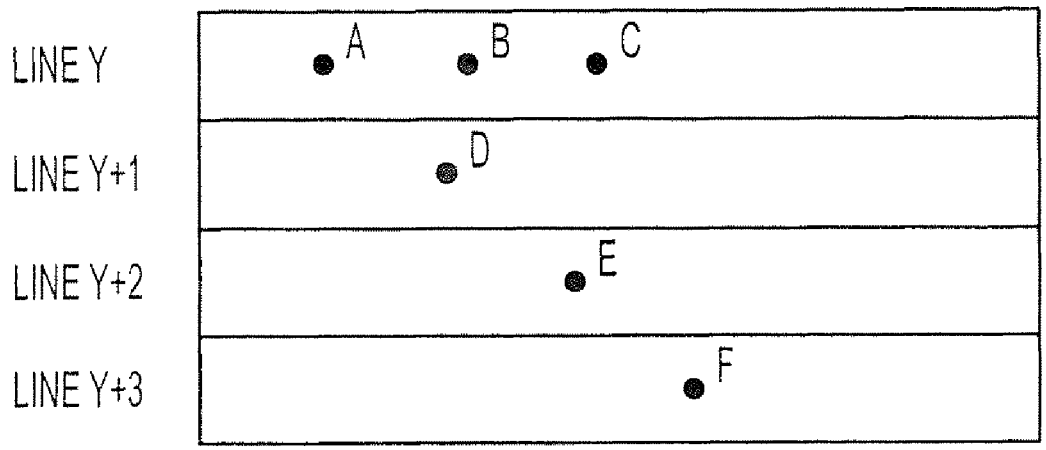
FIG. 5B is a diagram of a portion of an image before undergoing spatial transformation processing, which may be performed by the processor of FIG. 5A.
Figure 5C:
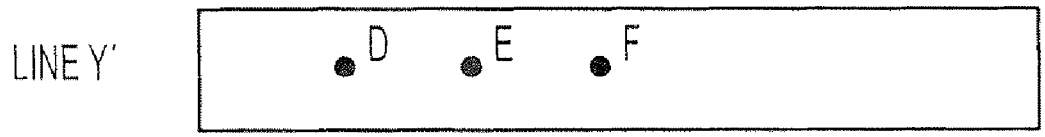
FIG. 5C is a diagram of a portion of an image after undergoing the spatial transformation processing of FIG. 5A.

One example of the processing which may be performed by processing circuit 201 is spatial transformation, for example, dewarping, (but other known pixel processing operations may be performed), which is described with reference to FIGS. 5B and 5C. In spatial transformation, the pixel data from one line of the input image is replaced by the pixel data from other lines of the input image, and the new sequence of pixel data is used to form a line of the output image. FIG. 5B illustrates a portion of an input image (lines y to y+3) before spatial transformation. FIG. 5C illustrates a line of a resulting portion of an output image (line y') after spatial transformation. In this example, to form line y' of the output image, pixels A, B, and C of line y of the input image are replaced with pixels D, E, and F, respectively, of different lines y+1 to y+3 of the input image. More particularly, pixel A is replaced with pixel D of line y+1; pixel B is replaced with pixel E of line y+2; and pixel C is replaced with pixel F of line y+3. On a greater scale, many pixels of each line may be replaced, such that the input image is spatially transformed, e.g., warped, to form the output image. In performing the above transformation, if no more than the illustrated four lines of the input image (e.g., lines y to y+3) are needed to form the illustrated line y' of the output image (e.g., line y), the fundamental requirement for this processing would be the four lines of the input image.

Figure 6:
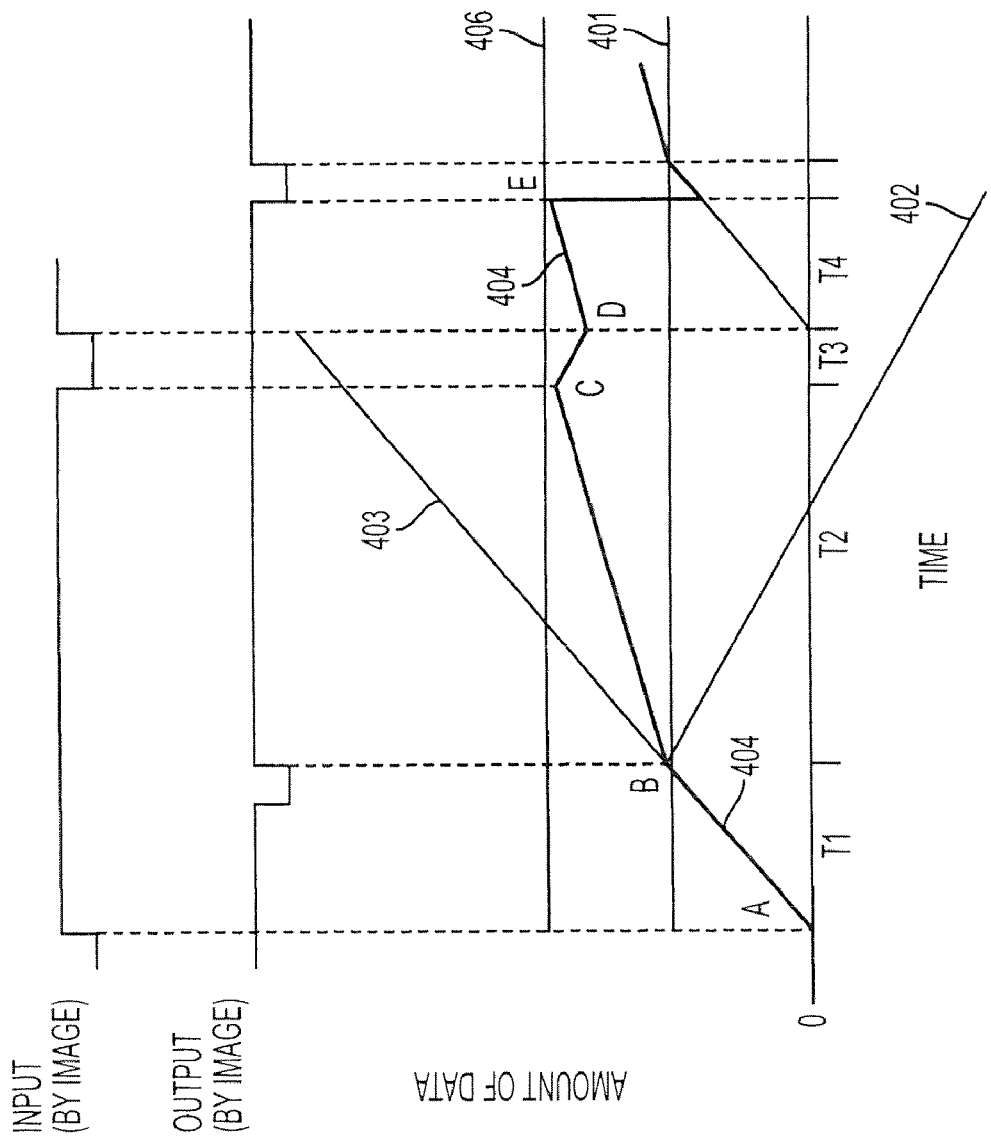
FIG. 6 is a graph illustrating the effect of fixed rate pixel data communication on the memory usage of a buffer of FIG. 5A.

Because the buffer 211 receives new pixel data from the image sensor 101 (FIG. 3) at a greater fixed rate than the stored pixel data can be converted by processing circuit 201 and overwritten (e.g., without losing pixel data still being used for processing), the size of the buffer 211 must be large enough to accommodate both the fundamental requirement and the "backlog" of input pixel data caused by the difference between the input rate and the discard rate. FIG. 6 illustrates an example memory usage of the FIG. 5A buffer 211. The horizontal axis represents time. The vertical axis represents amount of data. Line 401 represents the amount of data corresponding to the fundamental requirement, e.g., the number of rows of pixel data of input signal SIGin needed to form a single row of pixel data of output signal SIGout. The slope of line 403 is the fixed input rate at which the pixel data is written to the buffer 211 and, in this example, corresponds to the fixed average rate at which the image sensor 101 outputs the pixel data. The slope of line 402 is the fixed discard rate at which the stored pixel data can be overwritten in the buffer 211, without losing pixel data still being used by processing circuit 201 for processing.

Typically, the faster the stored pixel data of the input signal SIGin is used to produce the pixel data of output signal SIGout, the sooner the stored pixel data is no longer needed and can therefore be overwritten with new pixel data. The discard rate (line 402) can be fixed by a variety of limiting factors, e.g., an industry standard dictating the output rate of the pixel data, for example, as a video signal. Line 404 represents the memory usage of the buffer 211, which is more particularly the amount of stored pixel data that is still needed for processing and therefore cannot be overwritten. The highest value of the memory usage determines the minimum size (line 406) of the buffer 211.

During time interval T1, which spans from time A (FIG. 6) to time B (FIG. 6), the buffer 211 fills at the fixed input rate (line 403) until the fundamental requirement (line 401) is met. At time B (FIG. 6), enough rows of pixel data are stored in the buffer 211 to satisfy the fundamental requirement, e.g., to begin outputting the pixel data as the output signal SIGout and overwriting the stored pixel data when it is no longer needed for processing. Therefore, during time interval T2, which spans from time B (FIG. 6) to time C (FIG. 6), the buffer 211 continues to receive new pixel data at the input rate (line 403) and overwrite stored pixel data at the discard rate (line 402). Because the input rate is greater than the discard rate, the memory usage (line 404) increases at a rate equal to the difference between the input rate and discard rate.

At time C (FIG. 6), an entire first image of pixel data has been received from the image sensor 101, as indicated by the input signal of the pixel data. The blanking intervals which occur between the outputs of the rows of pixel data, forming the first image, are not shown. During time interval T3, which spans from time C (FIG. 6) to time D (FIG. 6), the image sensor 101 has ceased outputting the pixel data. Consequently, no new pixel data is written to the buffer 211, i.e., the input rate is zero, and the memory usage (line 404) decreases at the discard rate (line 402).

At time D (FIG. 6), the image sensor 101 begins to output a second image of pixel data to the buffer 211. Therefore, during time interval T4, which spans from time D (FIG. 6) to time E (FIG. 6), pixel data is again written to the buffer 211 at the input rate (line 403), and the memory usage (line 404) increases at a rate equal to the difference between the input rate (line 403) and discard rate (line 402). At time E (FIG. 6), the buffer 211 has output all pixel data that will be produced from the first image. The remaining pixel data of that first image can be overwritten, which in turn allows a precipitous drop of the memory usage (line 404) down to the amount of pixel data that has already been stored in the buffer 211 for the second image. The minimum size (line 406) of the buffer 211 is equal to the highest memory usage (line 404), which as shown may occur at time C (FIG. 6) or time E (FIG. 6) depending on the particular implementation.

Because the memory usage (line 404) rises at a rate determined by the sum of the fixed input rate (line 403) and discard rate (line 402), the minimum size (line 406) of the buffer 211 may be reduced by decreasing the fixed input rate (line 403) or by increasing the fixed discard rate (line 402). However, an increase in the discard rate may be unobtainable, e.g., due to standard constraints on the rate at which the pixel data is output from the first processor 201. A decrease of the fixed input rate (line 403) may also be unobtainable, e.g., the input rate (line 403) may be dictated by a desired length of time for outputting an entire image from the image sensor 101.

Figure 7A:
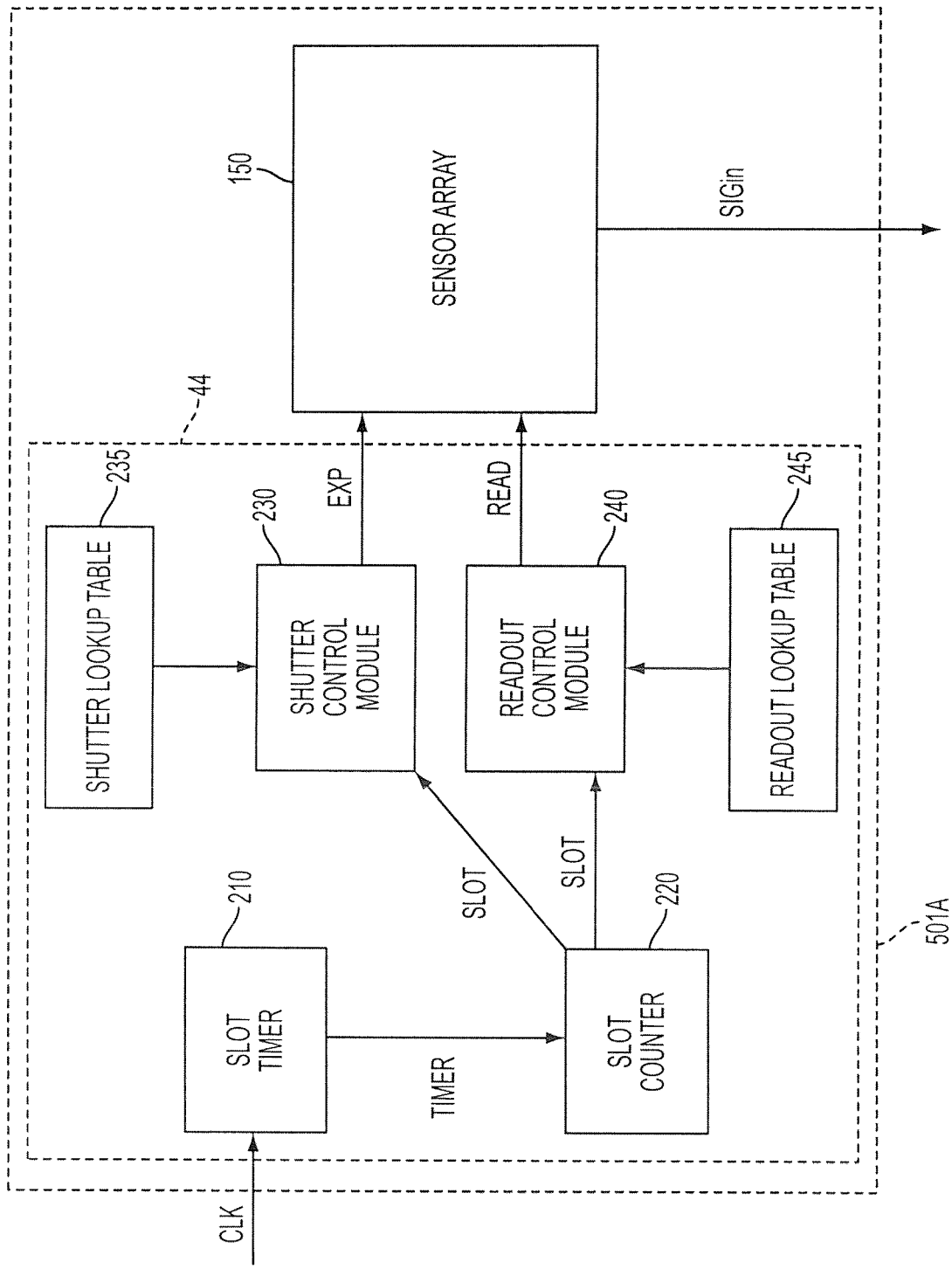
FIG. 7A is a block diagram of an image sensor with a variable output rate.

FIG. 7A is a block diagram illustrating an embodiment of a variable rate image sensor 501A that outputs pixel data at a variable rate. The image sensor 501A is capable of outputting the pixel data at a rate that varies over the course of a single image. The image sensor 501A includes a slot timer 210, a slot counter 220, a shutter control module 230, a shutter lookup table 235, a readout control module 240, a readout lookup table 245, and a sensor array 150.

The slot timer 210 of FIG. 7A, which specifies a current "slot timer number" as a slot timer signal TIMER, is incremented by "1" in response to a predetermined number of cycles of the clock signal CLK. Unlike the column counter 110 (FIG. 4A), the slot timer 210 does not identify a position within the sensor array 150. Further, the slot timer 210 does not reset the slot timer number to "0" upon counting through the number of columns within the sensor array 150. Rather, the slot timer 210 resets the current slot timer number to "0" upon counting through a predetermined number of clock cycles of the clock signal CLK. Each time the current slot timer number is reset to "0," the slot counter 220 increments a current slot number by "1" to indicate the start of a new time slot and outputs the slot number, as a slot number signal SLOT, to each of the shutter control module 230 and readout control module 240.

Figure 7B:
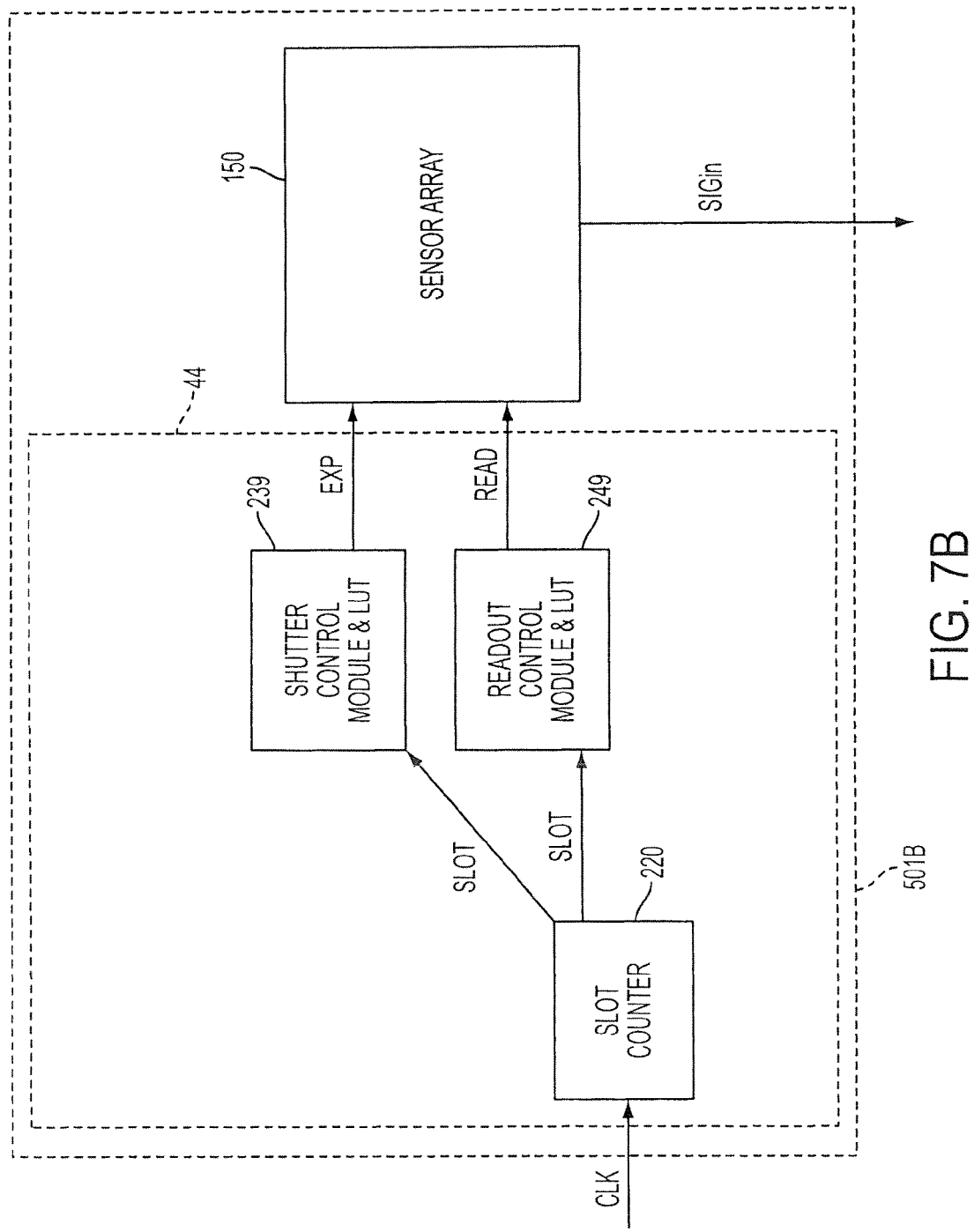
FIG. 7B is a block diagram of an image sensor which is similar in structure to the image sensor of FIG. 7A, but does not employ a slot timer and utilizes a combined shutter control module and lookup table and a combined readout control module and lookup table.

As an alternative to incrementing the current slot number in response to a slot timer number generated by the slot timer 210, the slot counter 220 may increment the current timer number in response to the clock signal CLK. Accordingly, FIG. 7B illustrates another variable rate image sensor 501B, which is similar to the variable rate image sensor 501A of FIG. 7A but differs in two respects. First, in the variable rate image sensor 501B of FIG. 7B, the slot timer 210 is removed and the clock signal CLK is input directly to the slot counter 220 such that the slot counter 220 determines the current slot number based directly upon the clock signal CLK. Second, in the variable rate image sensor 501B of FIG. 7B, the FIG. 7A lookup tables 235, 245 are combined with their respective control modules 230, 240, such that the shutter control module 230 (FIG. 7A) and shutter lookup table 235 (FIG. 7A) form a shutter control and LUT module 239 receiving the slot number signal SLOT; and the readout control module 240 (FIG. 7A) and readout lookup table 245 (FIG. 7A) form part of a readout control and LUT module 249 receiving the slot number signal SLOT.

Referring back to FIG. 7A, the shutter control module 230 is connected to the slot counter 220, sensor array 150, and shutter lookup table 235. Using the shutter lookup table 235, the shutter control module 230 determines which, if any, row numbers stored in the shutter lookup table 235 are correlated to the slot number supplied by the slot counter 220. If a row number is correlated to a slot number by the shutter lookup table 235, that row is integrated in the sensor array 150 during that time slot. If a row number is not correlated to a given time slot in the shutter lookup table 235, then it is not integrated during that time slot. The shutter lookup table 235 may expose multiple rows of the sensor array 150 during a single time slot, expose a single row of the sensor array 150 during multiple time slots, and expose no rows during particular time slots.

The readout control module 240 is connected to the slot counter 220, sensor array 150, and readout lookup table 245. Similar to the shutter lookup table 235, the readout lookup table 245 correlates time slots and row numbers. As with the shutter lookup table 235, some time slots may not be correlated to a row number in the readout lookup table 245. Just as the correlations in the shutter lookup table 235 are used by the shutter control module 230 to determine which, if any, rows are integrated during a particular time slot, the readout lookup table 245 is used by the readout control module 240 to determine which, if any, row is read out from the sensor array 150 during a particular time slot. However, unlike the shutter lookup table 235, the readout lookup table 245 does not correlate multiple rows to any single given time slot. Using the above-noted controls, the image sensor 501A may variably readout the pixel data at a faster rate or a slower rate depending on the time slot assignments within the readout lookup table 245.

Figure 7C:
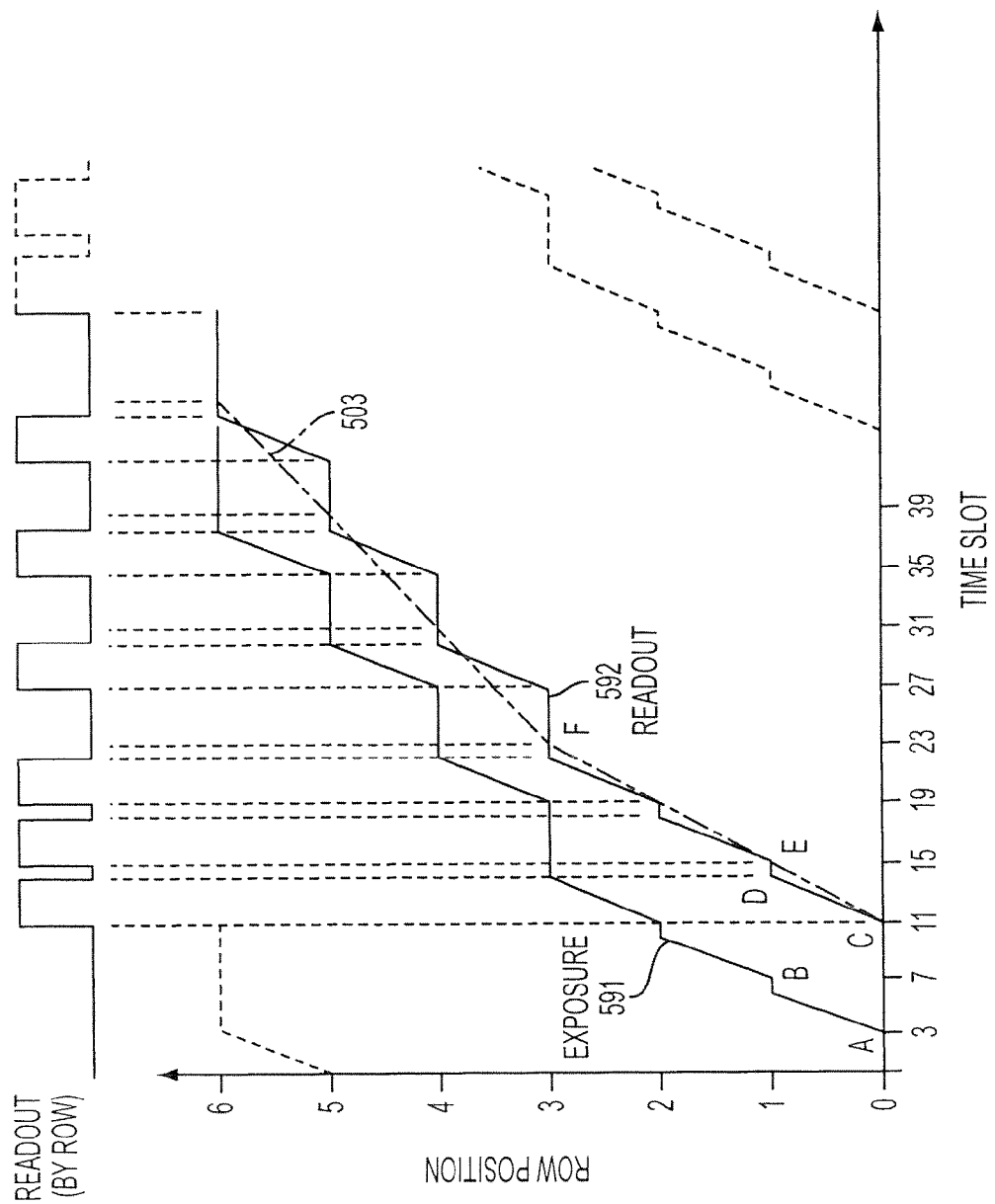
FIG. 7C is a graph illustrating a rolling shutter operation which may be employed by the image sensor of FIG. 7A.

FIG. 7C is a timing diagram illustrating an example of integration and readout intervals for a rolling shutter operation of the image sensor 501A. In the timing diagram, the vertical axis represents the row position of the pixel cells. The horizontal axis represents time and, more particularly, each tick mark on the horizontal axis represents the start of a time slot. The integration interval of a row continues until its readout, spanning from the latest point (as measured horizontally from the row position mark of the vertical axis) of the exposure line 591 until the latest point of the readout line 592 (as measured horizontally from the row position mark of the vertical axis).

For example, the integration interval of row 0 spans from time A (FIG. 7C) to time C (FIG. 7C). The integration interval of row 1 spans from time B (FIG. 7C) to time E (FIG. 7C). The readout interval of a row spans from the latest point of the readout line 592 (as measured horizontally from the row position mark of the vertical axis) until the blanking interval of the next row, which is shown as a respective flat portion of the readout line 592. For example, the readout interval of row 0 spans from time C (FIG. 7C) to time D (FIG. 7C). The blanking interval of row 1 spans from time D (FIG. 7C) to time E (FIG. 7C).

The timing for the output of pixel data, which corresponds to the readout intervals, is shown above the readout line 592. As can be seen, unlike the output of pixel data (FIG. 4B) of the conventional image sensor 101 (FIG. 4A), the output of pixel data of the image sensor 501A of FIG. 7C has a variable average output rate, shown as line 503, which changes at time F (FIG. 7C) in the illustrated example. More particularly, the output rate (line 503) is decreased by lengthening the blanking intervals after time F (FIG. 7C). For example, prior to time F (FIG. 7C), the blanking intervals have a duration of 1 time slot (e.g., time slots 11 and 15). After time F (FIG. 7C), the blanking intervals are lengthened from a duration of 1 time slot to 5 time slots (e.g., lengthened by 4 additional time slots 23-27). The integration intervals and readout intervals, however, retain their respective lengths of duration of 8 and 3 time slots.

The durations of the unequal blanking intervals are determined by the manner in which the readouts intervals of the rows are correlated to particular time slots by the readout lookup table 245. Similarly, the durations of the integration intervals of the rows are determined by the manner in which the integration intervals of the rows are correlated to particular time slots by the shutter lookup table 235. Adjustments to the correlations of time slots and rows in the readout lookup table 245 and shutter lookup table 235 can be used to vary the output rate 503 of the image sensor 501A.

Table 1, below, shows the time slots during which the particular rows are integrated and readout by the image sensor 501A in the illustrated example of FIG. 7C.

TABLE 1

| Time Slot | Row Integration | Row Readout |
|---|---|---|
| 0 | | |
| 1 | | |
| 2 | | |
| 3 | 0 | |
| 4 | 0 | |
| 5 | 0 | |
| 6 | 0 | |
| 7 | 0, 1 | |
| 8 | 0, 1 | |
| 9 | 0, 1 | |
| 10 | 0, 1 | |
| 11 | 1, 2 | 0 |
| 12 | 1, 2 | 0 |
| 13 | 1, 2 | 0 |
| 14 | 1, 2 | — |

TABLE 1-continued

| Time Slot | Row Integration | Row Readout |
|---|---|---|
| 15 | 2 | 1 |
| 16 | 2 | 1 |
| 17 | 2 | 1 |
| 18 | 2 | — |
| 19 | 3 | 2 |
| 20 | 3 | 2 |
| 21 | 3 | 2 |
| 22 | 3 | — |
| 23 | 3 | — |
| 24 | 3 | — |
| 25 | 3 | — |
| 26 | 3 | — |
| 27 | 4 | 3 |
| 48 | 4 | 3 |
| 29 | 4 | 3 |
| 30 | 4 | — |
| 31 | 4 | — |
| 32 | 4 | — |
| 33 | 4 | — |
| 34 | 4 | — |
| 35 | 5 | 4 |

In Table 1, an empty cell with no symbol " " indicates that integration or readout has not begun for the given image detected by the sensor array 150. The double dash symbol "--" indicates a blanking period. As can be seen, each of the rows are integrated over a duration of 8 time slots, and each of the rows are read out over a duration of 3 time slots. However, the blanking intervals are varied such that the blanking intervals each have a duration of 1 time slot or 5 time slots. Thus, the blanking intervals prior to time slot 22, which corresponds time F (FIG. 7C), have a duration of 1 time slot. The illustrated blanking intervals starting at and continuing after time slot 22 have a duration of 5 time slots. Consequently, at time slot 23, when the blanking interval is lengthened by four time slots, the variable output rate (line 503) changes from a higher to lower rate. At the completion of time slot 22, each of rows 0, 1, and 2 have been read out by the image sensor as pixel data. These three rows of pixel data may meet the fundamental requirement (line 401) of a processing operation, such that the variable output rate (line 503) of the image sensor 501A is decreased upon meeting the fundamental requirement (line 401) at time slot 22 to decrease the amount of memory usage of the buffer 211 by reducing the difference between the input rate and the discard rate.

Tables 2 and 3 are portions of the shutter lookup table 235 and readout lookup table 245 corresponding to the illustrated rolling shutter operation of FIG. 7C. The exposure of a row extends from the start of the integration interval until the start of the readout interval. The readout interval of the row ends when all pixel data of the row has been output by the image sensor 501A. Therefore, to control the integration and readout intervals, only their start times need to be provided to the sensor array 150. Tables 2 and 3 accordingly correlate only the start times of the integration intervals (Table 2) and start times of the readout intervals (Table 3) to respective time slots. Less chip space is required to configure a shutter lookup table 235 and readout lookup table 245 containing only the information within Tables 2 and 3 (as compared to the information of Table 1).

TABLE 2

Portion of shutter lookup table 235

| Time Slot | Start Row Integration |
|---|---|
| 3 | 0 |
| 7 | 1 |
| 11 | 2 |
| 19 | 3 |
| 27 | 4 |
| 35 | 5 |

TABLE 3

Portion of readout lookup table 245

| Time Slot | Start Row Readout |
|---|---|
| 11 | 0 |
| 15 | 1 |
| 19 | 2 |
| 27 | 3 |
| 35 | 4 |

Some integration and readout operations may require adjustments to the integration intervals and readout intervals of the pixel cells 170. For example, to adjust exposure, the duration of the integration intervals may be decreased by adding one or more time slots to each time slot cell of the shutter lookup table 235 or by subtracting one or more time slots from each time slot cell of the readout lookup table 235. Conversely, the duration of the integration intervals may be increased by subtracting one or more time slots from each time slot cell of the shutter lookup table 235 or by adding one or more time slots to each time slot cell of the readout lookup table 235. As a specific example, if two time slots are subtracted from each time slot cell in Table 2, the duration of integration, which spans from the start of integration to the start of readout, will increase from a duration of 8 time slots (see time slots 3 and 11 respectively assigned, before the adjustment, to the start of integration and the start of readout for row 0) to a duration of 10 time slots (because, after the adjustment, time slots 1 and 11 would be respectively assigned to the start of integration and the start of readout for row 0).

As an alternative to employing lookup tables that correlate respective starts of integration and readout intervals to each row 30R, further simplified lookup tables may be provided in which particular rows are not identified. For example, if the sensor array 150 does not require identification of a specific row 30R for integration or readout by the shutter control module 230 and readout control module 240, respectively (e.g., if the sensor initiates the integration and readout of the rows 30R in a predetermined sequence), there is no need for identification of a particular row by the exposure signal EXP or readout signal READ. Consequently, there would be no need for identification of particular rows in the shutter lookup table 235 or readout lookup table 235. Thus, tables may be provided which merely identify when integration or readout should begin for the next row (e.g., the next row in the predetermined sequence).

As a more specific example, if the sensor array 150 initiates integration of the rows 30R in sequential order {0, 1, 2, 3 ... }, only time slots would need to be identified. In lieu of Table 2, Table 4 below could be provided as part of the shutter lookup table 235.

TABLE 4

| Time Slots for Start of Integration |
|---|
| 3 |
| 7 |
| 11 |
| 19 |
| 27 |
| 35 |

In lieu of Table 3, Table 5 below could be provided as part of the readout lookup table 245.

TABLE 5

| Time Slots for Start of Row Readout |
|---|
| 11 |
| 15 |
| 19 |
| 27 |
| 35 |

By utilizing smaller lookup tables, die space can be conserved in the respective imaging device.

Figure 8:
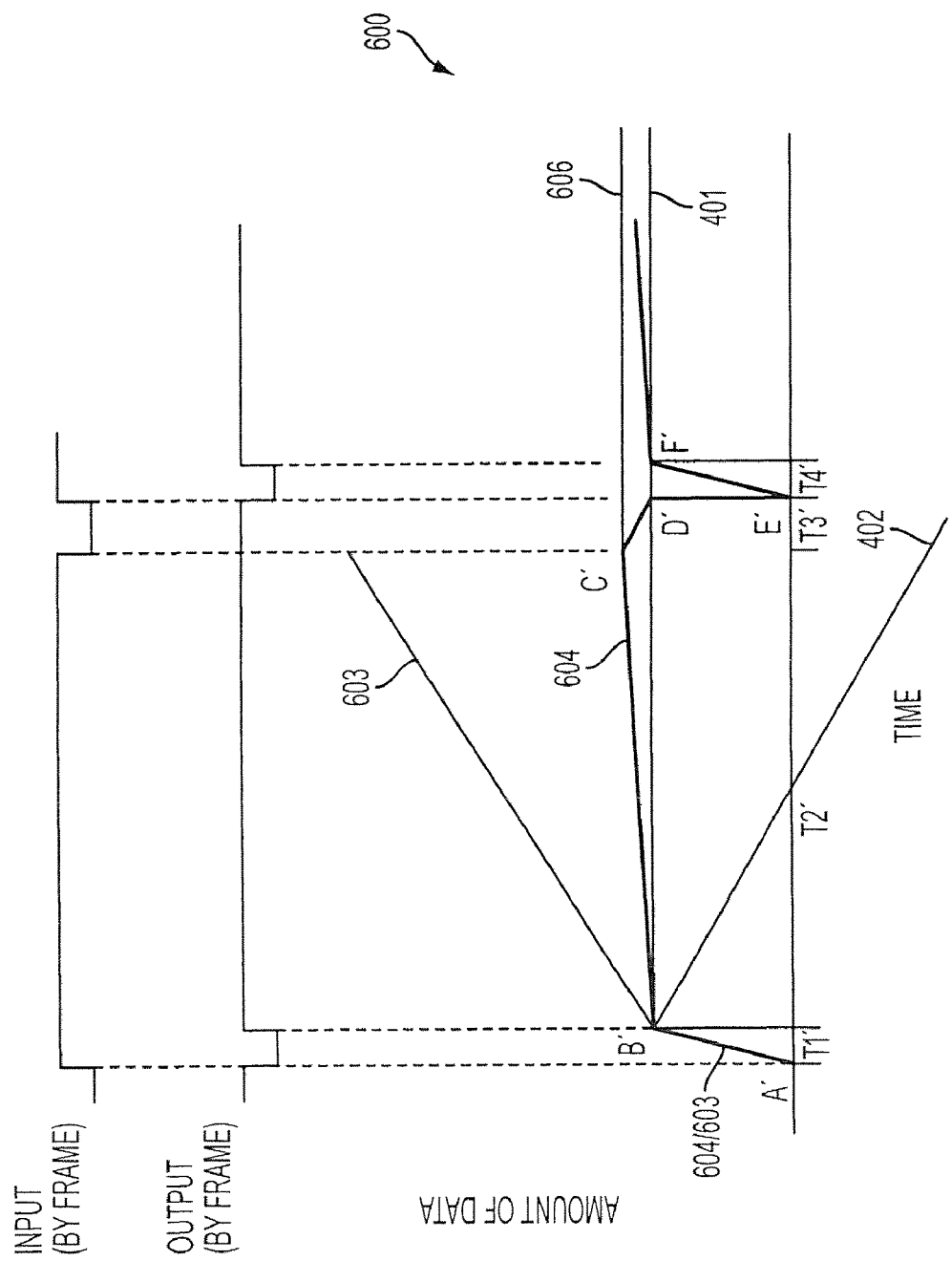
FIG. 8 is a graph illustrating the effect of variable rate pixel data communication on the memory usage of an image processing system.

FIG. 8 is a graph 600 illustrating an example of the memory usage of the image processing circuit 201 of FIG. 5A in conjunction with the variable rate image sensor 501A of FIG. 7A. The vertical axis represents the amount of data stored in the buffer 211. The horizontal axis represents time. Line 604 represents the memory usage of the buffer 211. Line 401 represents the fundamental requirement of the processing performed by the image processor 201. Line 603 represents the variable rate at which pixel data is input to the buffer 211. Line 402 represents the discard rate at which the pixel data, stored by the buffer 211, can be overwritten without losing pixel data still being used to generate the new pixel data of the output signal SIGout. The highest memory usage (line 604) determines the minimum size (line 606) of the buffer 211.

As can be seen, the slope of line 603 and the slope of line 604 are identical during time interval T1' (which spans from time A' (FIG. 8) to time B' (FIG. 8)). At the beginning of time interval T1', the buffer 211 is empty. Therefore, during time interval T1', the variable input rate (line 603) is set a higher rate than the conventional fixed input rate (line 403) so as to more quickly meet the fundamental requirement (line 401). During time interval T2' (which spans from time B' (FIG. 8) to time C' (FIG. 8)) the variable input rate (line 603) is set lower than the conventional fixed input rate (line 403) to prevent the memory usage (line 604) from rising too steeply, which would in turn cause an increase in the minimum size (line 606) of the buffer 211.

At time C' (FIG. 8), the entire image frame of pixel data has been received from the variable-rate image sensor 501A. During time interval T3' (which spans from time C' (FIG. 8) to time D' (FIG. 8)), the variable-rate image sensor 501A is in a blanking period. As no new pixel data is being stored in the buffer 211 during the blanking period, the overall memory usage decreases at the discard rate (line 402). At time D' (FIG. 8), the entire image of pixel data has been output from the buffer 211. At the same time E' (FIG. 8) the image sensor 501A begins to output a new image of pixel data to the buffer 211. Thus, the buffer state in time interval T4' (FIG. 8) is identical to the buffer state in time interval T1' (FIG. 8).

In comparing graph 600 of FIG. 8 against the graph 400 of FIG. 6, one can see at least two ways in which the variable input rate (line 603) can decrease the minimum size (line 606) of the buffer 211 (as compared to the minimum size (line 406) (FIG. 6)). First, because the difference between the variable input rate (line 603) and fixed discard rate (line 402) is decreased during the time interval T2', the memory usage (line 604) of FIG. 8 does not increase as sharply or as much as the memory usage (line 404) of FIG. 6. Second, because the variable input rate (line 603) can be significantly increased, the duration of the time interval T1' for meeting the fundamental requirement (line 401) can be shortened and the time interval T2' for inputting the remainder of the pixel data can be lengthened, which also results in a flatter increase in memory usage (line 604) during time interval T2'.

Figure 9:
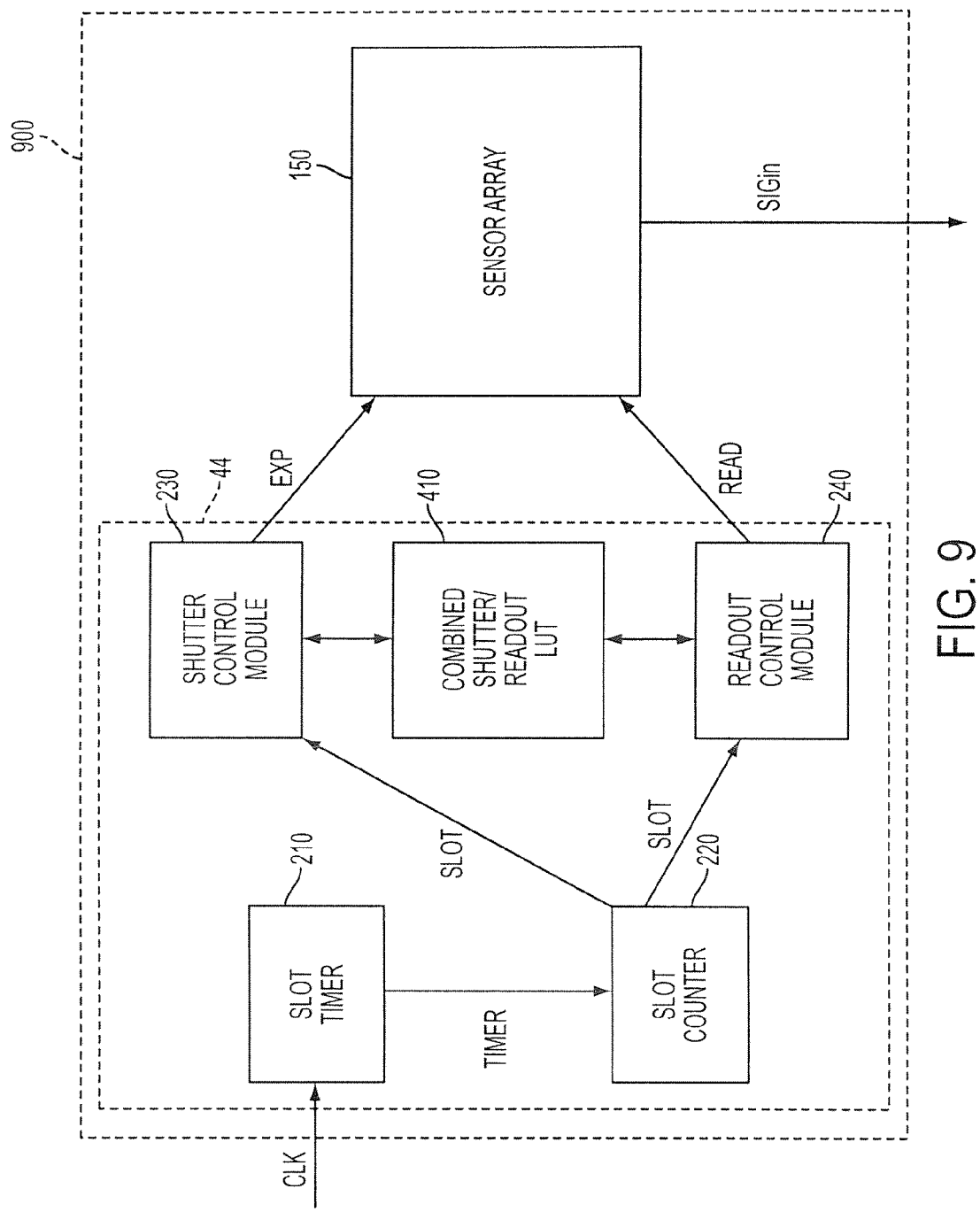
FIG. 9 is a block diagram of an image sensor employing a combined shutter and readout lookup table.

Another example of a variable rate image sensor 900, which employs a combined shutter and readout lookup table 410, is shown by FIG. 9. The image sensor 900 is identical to the image sensor 501A of FIG. 7A, except that the shutter lookup table 235 (FIG. 7A) and the readout lookup table 245 (FIG. 7A) have been replaced by the combined shutter and readout table 410. The correlations of the combined shutter and readout table 410 may be equivalent to the correlations in the shutter lookup table 235 (FIG. 7A) and readout lookup table 245 (FIG. 7A) of the image sensor 501A of FIG. 7A. An example of a portion of the combined shutter and readout lookup table 410 is shown below in Table 6, which combines Tables 4 and 5 discussed above.

TABLE 6

Portion of combined shutter and readout lookup table 410

| Time Slot | Start Row Integration | Start Row Readout |
|---|---|---|
| 3 | 0 | |
| 7 | 1 | |
| 11 | 2 | 0 |
| 15 | | 1 |
| 19 | 3 | 2 |
| 27 | 4 | 3 |
| 35 | 5 | 4 |

As the combined shutter and readout lookup table 410 of Table 6 is smaller, overall, than the separate shutter lookup table 235 and readout lookup table 245 of Tables 2 and 3, die space can be conserved in the respective imaging device.

Figure 10:
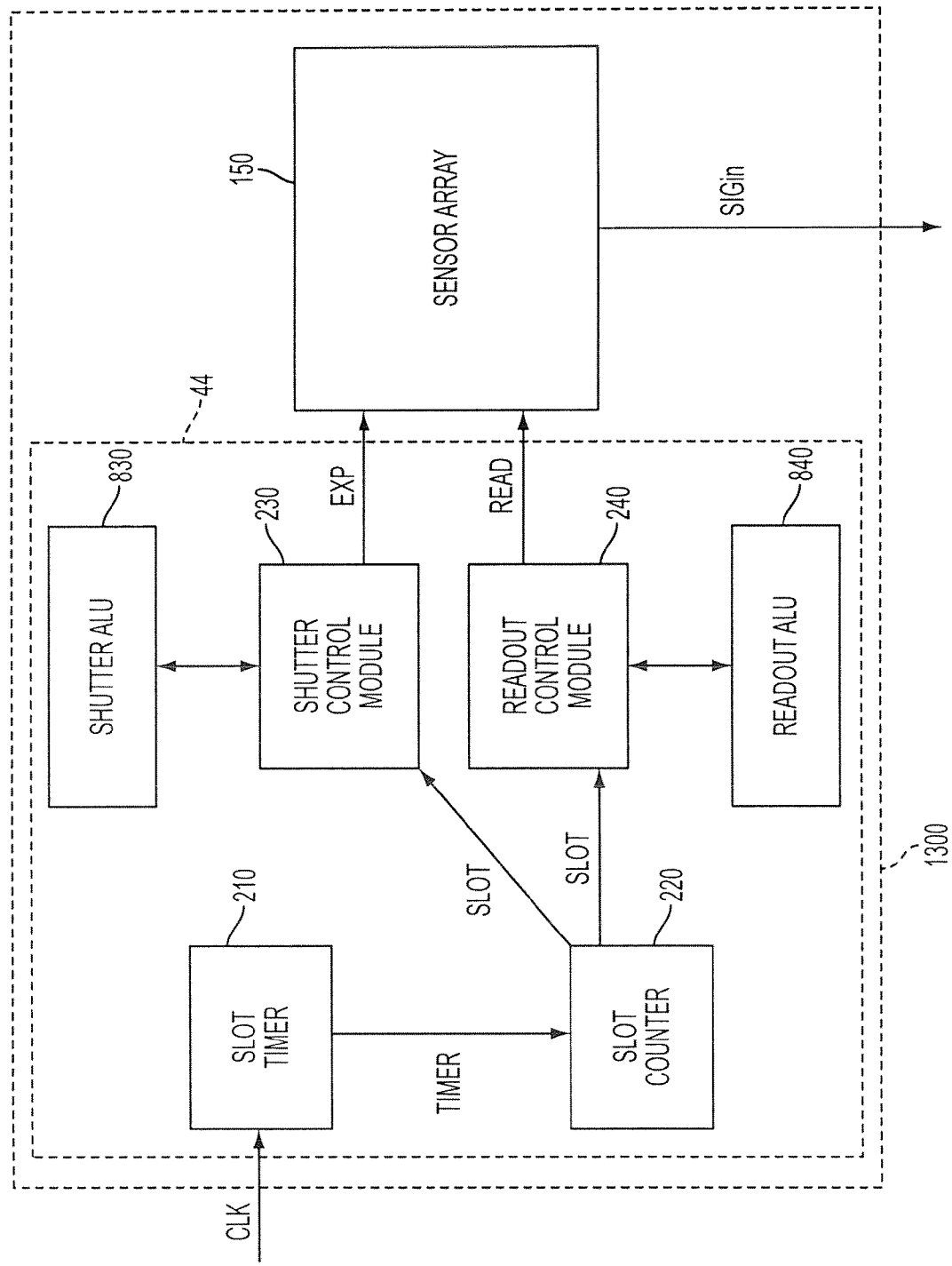
FIG. 10 is a block diagram of an image sensor which is similar in structure to the image sensor of FIG. 7A, but replaces the shutter lookup table and readout lookup table with a shutter algorithmic unit and a readout algorithmic unit, respectively.

FIG. 10 is a diagram of an image sensor 1300 that is identical in structure to image sensor 501A (FIG. 7A), except that the shutter lookup table 235 (FIG. 7A) is replaced with a shutter algorithmic unit (ALV) 830. Shutter algorithmic unit 830 receives the current time slot from the shutter control module 230 and calculates when and which rows should be exposed. While the shutter lookup table 235 is a static set of correlations, the shutter algorithmic unit 830 may produce dynamic correlations based on the current conditions, past performance, or other factors. Similarly, the readout lookup table 245 (FIG. 7A) is replaced by a readout algorithmic unit 840, which may dynamically generate correlations to determine when and which rows of the sensor array 150, if any, should be read out. Shutter algorithmic unit 830 and readout algorithmic unit 840 may include memory for preserving settings between uses, for providing default correlations, or for any other useful purpose.

Figure 11:
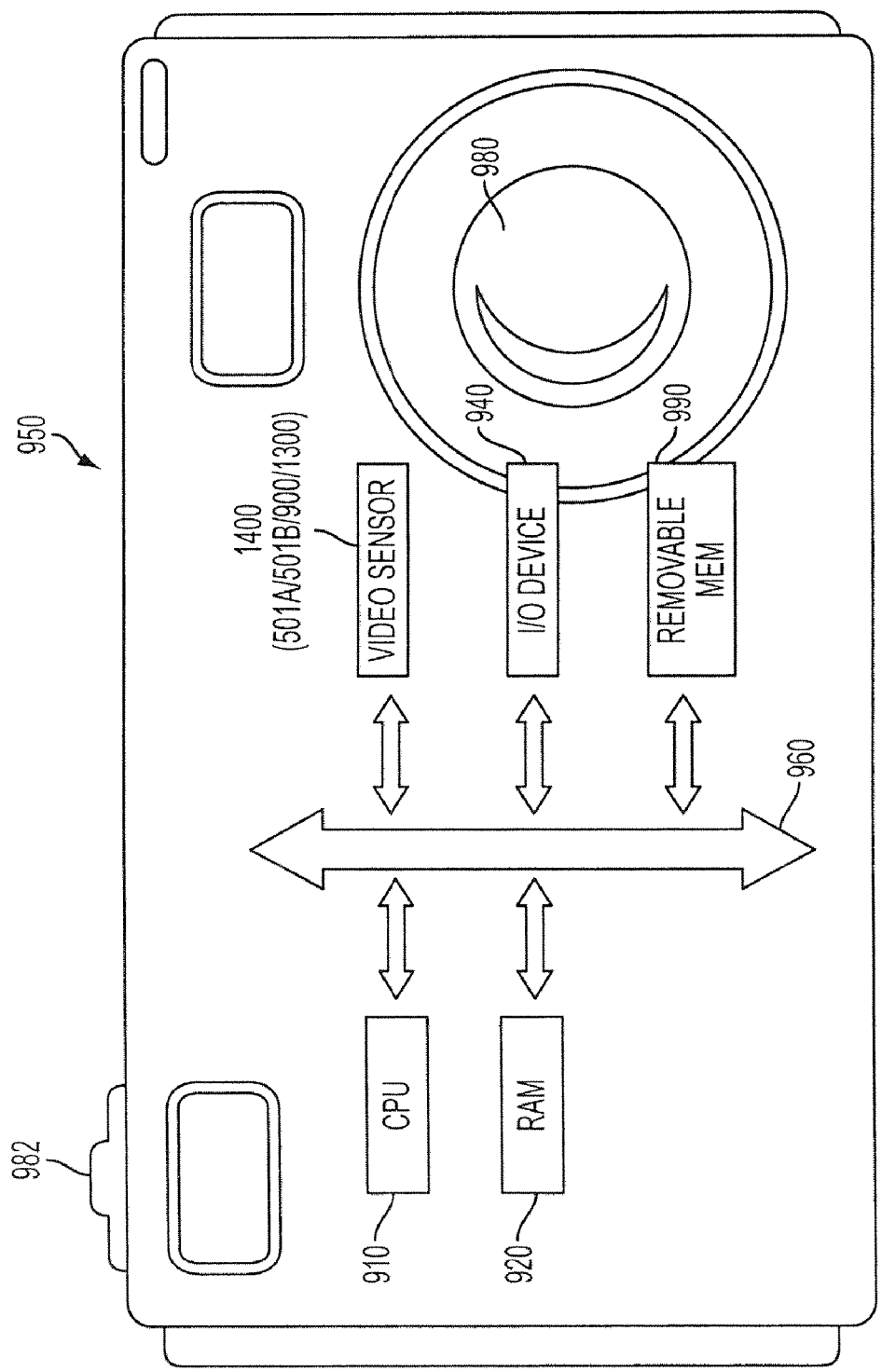
FIG. 11 is a diagram of an imaging system that may employ image sensors of the disclosed embodiments.

FIG. 11 shows an imaging system 950, e.g., a video camera, which may employ aspects of disclosed embodiments of the invention. The system 950 may include a computer system, camera system (such as a digital still or video camera), scanner, machine vision, vehicle navigation system, image telephone, surveillance system, automatic focus system, star tracker system, motion detection system, image stabilization system, and other systems employing an image sensor.

System 950 may also include a lens 980 for focusing an image onto a pixel array of an image sensor, such as a pixel array of one of the variable rate image sensors 501A, 501B, 900, 1300, 1400, when a shutter release button 982 is pressed. System 950 generally comprises a central processing unit (CPU) 910, such as a microprocessor that controls camera functions and image flow, and communicates with one or more input/output (I/O) devices 940 over a bus 960. The image sensor 900 also communicates with the CPU 910 over the bus 960. The system 950 also includes random access memory (RAM) 920, and can include removable memory 990, such as flash memory, which also communicates with the CPU 910 over the bus 960. The image sensor 900 may be combined with the CPU 910, with or without memory storage on a single integrated circuit, such as, for example, a system-on-a-chip, or on a different chip than the CPU 910. As described above, pixel data from the sensor array 150 (FIGS. 4, 6, 9, and 10) can be output from the image sensor 1400 and stored, for example in the random access memory 920, on a removable memory 950, or in the CPU 910.

Although embodiments have been described in relation to varying the output rate of the readout of a pixel array, using a CMOS image sensor as an example, the claimed invention is not limited to use with a CMOS sensor and can be applied to variably control the readout rates of other pixel arrays. Embodiments may also be adapted to variably read out pixel signals from one portion of a pixel signal processor to another downstream portion of a pixel signal processor.

It should be understood, therefore, though various embodiments have been discussed and illustrated, the invention is not limited to the embodiments. Various changes can be made thereto.

What is claimed as new and desired to be protected by Letters Patent of the United States is:

1. An imaging device comprising:
   an image sensor comprising an array of pixel cells for detecting an image and being configured to read out pixel signals, each corresponding to an amount of light detected by one of said pixel cells, and an analog-to-digital converter for converting said pixel signals to pixel data;
   a timing and control device for controlling the readout of said pixel signals, wherein said pixel signals collectively represent an image and sets of said pixel data are output from said sensor with blanking intervals being between at least some of said sets of pixel data, and wherein at least two of said blanking intervals between output sets of pixels have different durations;
   a timing device for outputting a current time slot that increments at a predetermined interval;
   a memory device for correlating each row of said pixel cells to at least one of said increments of said time slot; and
   a readout control device configured to output a readout signal to said sensor, said readout signal identifying a respective one of said rows of pixel cells to said sensor based on said current time slot, said sensor reading out said pixels signals of said respective one of said rows in response to said readout signal, wherein said memory device comprises a lookup table correlating each row of said pixel cells to at least one of said increments of said time slot.

2. The imaging device of claim 1, wherein said pixel data is output row-by-row with at least one of said blanking intervals being between each of said sets of pixel data.

3. An imaging device comprising:
   an image sensor comprising an array of pixel cells for detecting an image and being configured to read out pixel signals, each corresponding to an amount of light detected by one of said pixel cells, and an analog-to-digital converter for converting said pixel signals to pixel data;
   a timing and control device for controlling the readout of said pixel signals, wherein said pixel signals collectively represent an image and sets of said pixel data are output from said sensor with blanking intervals being between at least some of said sets of pixel data, wherein at least two of said blanking intervals between output sets of pixels have different durations, and wherein said pixel data is output line-by-line with at least one of said blanking intervals being between each of said sets of pixel data; and
   a buffer configured to store at least an amount of said digital pixel data needed to perform an image processing operation, said buffer receiving said digital pixel data from said image sensor, wherein said blanking intervals comprise at least one first blanking interval having a first duration and being between a first plurality of said sets of said pixel data and a second blanking interval having a second duration and being a second plurality of said sets of said pixel data, said first duration being shorter than said second duration, and wherein said first plurality of said sets of said pixel data are output to said buffer prior to said buffer storing said amount of said digital pixel data, and said second plurality of said sets of said pixel data are output to said buffer after said buffer stores said amount of said digital pixel data.

4. An imaging device comprising:
   an image sensor comprising an array of pixel cells for detecting an image and being configured to read out pixel signals, each corresponding to an amount of light detected by one of said pixel cells, and an analog-to-digital converter for converting said pixel signals to pixel data;
   a timing and control device for controlling the readout of said pixel signals, wherein said pixel signals collectively represent an image and sets of said pixel data are output from said sensor with blanking intervals being between at least some of said sets of pixel data, wherein at least two of said blanking intervals between output sets of pixels have different durations, and wherein said pixel data is output line-by-line with at least one of said blanking intervals being between each of said sets of pixel data; and
   a buffer configured to input said digital pixel data and store at least an amount of said digital pixel data needed to perform an image processing operation on said digital pixel data, said buffer receiving said digital pixel data from said image sensor, wherein, after said amount of said digital pixel data is input to said buffer, said lengths of duration of said blanking intervals are increased to decrease a rate of inputting said digital pixel data to said buffer.

5. The imaging device of claim 4, wherein said processing operation is completed for said digital pixel data of said image before inputting digital pixel data of a next image from said image sensor to said buffer.

6. The imaging device of claim 5, wherein, in response to completing said processing operation for said digital pixel data of said image, respective durations of blanking intervals for a readout of a next image are decreased to increase a rate of inputting said digital pixel data into said buffer.

7. An imaging device comprising:
   a sensor device comprising pixel cells for detecting light and being configured to read out slot timer numbers, each indicating an amount of light detected by one of said pixel cells, said slot timer numbers collectively representing an image;
   a first counter device for incrementing and outputting a first signal that identifies a current time slot, said sensor device generating and reading out said slot timer numbers of said image frame over a plurality of time slots which includes said current time slot;
   at least one memory device storing correlation data assigning an integration interval of each row of said pixel cells to a respective plurality of said time slots and assigning a readout interval of each row to at least one of said time slots; and
   at least one control device configured to output at least one control signal to said sensor device, said at least one control signal based on said correlation data identifying at least one of a start time of an integration interval for one of said rows of pixel cells and a start of a readout interval for one of said rows of pixel cells.

8. The imaging device of claim 7, wherein a rate of reading out said slot timer numbers from said sensor device is adjusted, during readout of said image, based on said correlation data.

9. The imaging device of claim 7, wherein said correlation data sets respective durations between readout intervals of said rows of pixel cells at varying durations.

10. The imaging device of claim 9, wherein said readout intervals have equal durations.

11. The imaging device of claim 7, wherein said correlation data sets respective durations between said integration intervals of said rows of pixel cells at varying durations.

12. The imaging device of claim 11, wherein said integration intervals have equal durations.

13. The imaging device of claim 7, wherein said at least one control signal is based only on said first signal and said correlation data.

14. The imaging device of claim 7, further comprising:
   a pixel cell array within said sensor device; and
   a second counter device for incrementing and outputting a second value that increments in response to a predetermined number of cycles of a clock signal and resets after a predetermined number of increments of said second value, said number of increments of said second value being less than the number of pixel cells per row of said pixel cell array, wherein said current time slot increments in response to a predetermined number of increments of said second value.

15. The imaging device of claim 14, wherein said correlation data assigns a respective start time of said integration interval of each row of said pixel cells to a respective one of said time slots and a respective one of said second values.

16. The imaging device of claim 15, wherein a duration of said integration interval of each row of said pixel cells is adjusted by changing said respective one of said second values.

17. The imaging device of claim 14, wherein said correlation data assigns a respective start time of said readout interval of each row of said pixel cells to a respective one of said time slots and a respective one of said second values.

18. The imaging device of claim 17, wherein a duration of said integration interval of each row of said pixel cells is adjusted by changing said respective one of said second values.

19. A method of varying a readout rate of an image sensor, comprising:
dividing an interval for reading out pixel cells of a sensor array into a plurality of time slots;
correlating each of a plurality of readout intervals, for respectively reading out a row of said pixel cells, to at least one of said time slots; and
reading out an image of pixel data by controlling said integrating and reading out of said pixel cells based on said correlations of said integration intervals and readout intervals to said time slots, wherein the plurality of readout intervals increment at a variable rate, wherein the time slots increment at a fixed rate, and wherein correlating each of the plurality of readout intervals to at least one of said time slots comprises correlating the variable rate with the fixed rate.

20. The method of claim 19, further comprising:
controlling said reading out of said pixel cells based on a current time slot of said time slots.

21. The method of claim 19, further comprising:
correlating each of a plurality of integration intervals, for respectively integrating a row of said pixel cells, to at least one of said time slots; and
controlling said integrating of said pixel cells based on said current time slot of said time slots.

22. The method of claim 21, further comprising:
adjusting a length of said integration intervals by adjusting said correlations of said integration intervals and readout intervals to said time slots.

23. The method of claim 19, further comprising:
varying a rate of reading out of said image based on said correlations of said readout intervals to said time slots.

24. The method of claim 21, further comprising:
adjusting a rate of said reading out of said image by adjusting said correlations of said integration intervals and readout intervals to said time slots.

25. A method of varying a readout rate of an image sensor, comprising:
dividing an interval for reading out pixel cells of a sensor array into a plurality of time slots;
correlating each of a plurality of readout intervals, for respectively reading out a row of said pixel cells, to at least one of said time slots;
reading out an image of pixel data by controlling said integrating and reading out of said pixel cells based on said correlations of said integration intervals and readout intervals to said time slots;
correlating each of a plurality of integration intervals, for respectively integrating a row of said pixel cells, to at least one of said time slots;
controlling said integrating of said pixel cells based on said current time slot of said time slots;
dividing each of said plurality of time slots into a plurality of second time periods; and
correlating a start time for each of said plurality of integration intervals to one of said time slots and one of said second time intervals.

26. A method of varying a readout rate of an image sensor, comprising:
dividing an interval for reading out pixel cells of a sensor array into a plurality of time slots;
correlating each of a plurality of readout intervals, for respectively reading out a row of said pixel cells, to at least one of said time slots;
reading out an image of pixel data by controlling said integrating and reading out of said pixel cells based on said correlations of said integration intervals and readout intervals to said time slots;
dividing each of said plurality of time slots into a plurality of second time periods; and
correlating a start time for each of said plurality of readout intervals to one of said time slots and one of said second time intervals.

27. A method of varying a readout rate of an image sensor, comprising:
dividing an interval for reading out pixel cells of a sensor array into a plurality of time slots;
correlating each of a plurality of readout intervals, for respectively reading out a row of said pixel cells, to at least one of said time slots;
reading out an image of pixel data by controlling said integrating and reading out of said pixel cells based on said correlations of said integration intervals and readout intervals to said time slots;
dividing each of said plurality of time slots into a plurality of second time periods; and
during said reading out of said image, adjusting a rate of said reading out of said image based on a current time slot of said time slots and based on a current second time interval of said second time intervals.

28. An imaging device comprising:
a pixel array having a plurality of pixels arranged in rows and columns;
a control circuit for periodically generating a plurality of time slots for reading out rows of pixels of said pixel array, wherein the time slots increment at a fixed rate;
a circuit for correlating each of a plurality of readout intervals to at least one of the time slots, wherein the plurality of readout intervals increment at a variable rate, and wherein the circuit correlates each of the plurality of readout intervals to at least one of the time slots by correlating the variable rate with the fixed rate; and
a readout control circuit for reading out rows of said pixel array at the variable rate in accordance with said correlation for readout.

29. An imaging device comprising:
a pixel array having a plurality of pixels arranged in rows and columns;
a control circuit for periodically generating a plurality of time slots for reading out rows of pixels of said pixel array;
a circuit for correlating a time slot with a pixel row for readout in a manner which enables a variable readout rate for rows of pixels of said array; and
a readout control circuit for reading out rows of said pixel array in accordance with said correlation for readout, wherein said circuit for correlating a time slot with a pixel row for readout comprises a lookup table.

* * * * *